Aug. 4, 1964 F. W. JOHNSON 3,143,663

FREQUENCY DOUBLER

Filed Sept. 21, 1961

INVENTOR.
FREDERICK W. JOHNSON
BY Moody and Harris
ATTORNEYS 3,143,663
Patented Aug. 4, 1964

1

3,143,663

FREQUENCY DOUBLER

Frederick W. Johnson, Cedar Rapids, Iowa, assignor to Collins Radio Company, Cedar Rapids, Iowa, a corporation of Iowa Filed Sept. 21, 1961, Ser. No. 139,708
3 Claims. (Cl. 307—88.5)

This invention relates to a frequency doubling circuit wherein an output signal is provided that is twice the frequency of an alternating current input signal.

It is oftentimes desirable to double the frequency of an available alternating current input signal, especially if accomplished without appreciable losses dues to heat dissipation. For example, if a 60 cycle per second signal from a conventional available source is doubled in frequency without undue internal heat dissipation, the output signal may be effectively used to operate a blower motor at a speed greater than would be possible when utilizing the signal from the available 60 cycle per second power source.

While many frequency doubler circuits have been proposed and utilized heretofore, none have provided a satisfactory transistorized frequency doubler that combines simplicity, reliability, and long service life, as well as minimizing heat dissipation.

It is therefore an object of this invention to provide an improved frequency doubling circuit that is simple, highly reliable in operation, and capable of long service life.

It is also an object of this invention to provide a frequency doubling circuit that, in addition to being simple and highly reliable, also maintains losses due to heat dissipation at a minimum.

It is a feature of this invention to provide a frequency doubling circuit utilizing a plurality of transistors each of which receives the input signal in quadrature phase relationship with a square wave control signal to produce an output signal from said circuit having a frequency twice that of the input signal.

More particularly, it is a feature of this invention to provide a transistorized frequency doubler circuit wherein two transistors are connected to each side of an alternating current source. In addition, phase shifting and wave forming means are also connected to receive the signal from said alternating current source and cause shifted square wave output signals to be applied to the bases of the four transistors to control the conduction of said transistors in such a manner that the output frequency from the circuit is twice that of the input frequency.

With these and other objects in view which will become apparent to one skilled in the art as the description proceeds, this invention resides in the novel construction, combination and arrangement of parts susbtantially as hereinafter described and more particularly defined by the appended claims, it being understood that such changes in the precise embodiment of the herein disclosed invention may be included as come within the scope of the claims.

Figure 1:
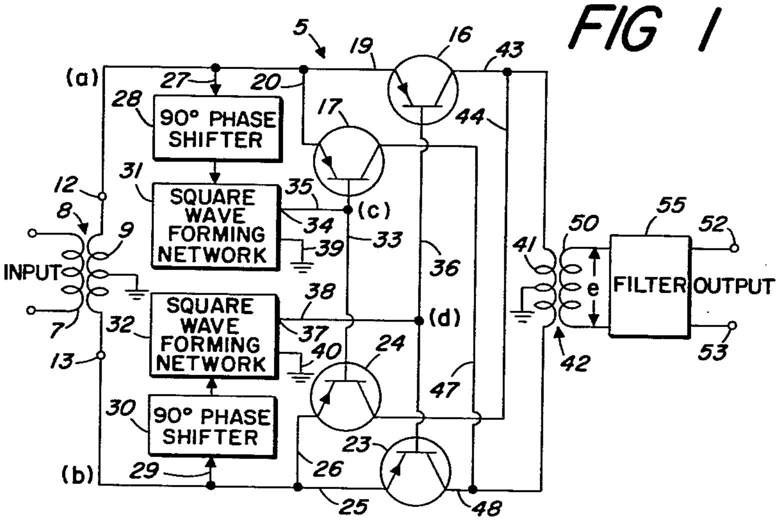

The accompanying drawing illustrates one complete example of the embodiment of the invention according to the best mode so far devised for the practical application of the principles thereof, and in which:

FIGURE 1 is a schematic presentation of the frequency doubling circuit of this invention; and

2

Figure 2:
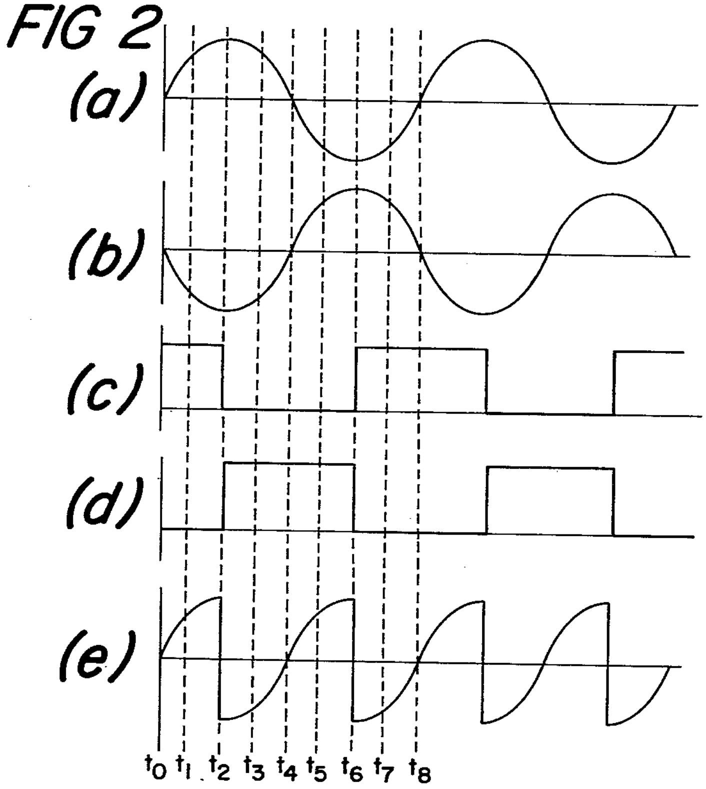

FIGURE 2 is a series of typical wave forms which might be found at designated points in the schematic of FIGURE 1 illustrating the operation of the frequency doubling circuit of this invention.

Referring now to the drawing, the numeral 5 refers generally to the frequency doubling circuit of this invention. As shown in FIGURE 1, an A.C. signal from a conventional power source (not shown) may be received at input winding 7 of conventional transformer 8, which transformer also includes an output winding 9 center tapped to ground and having terminals 12 and 13 at each side. The signal appearing at terminal 12 will, of course, have a polarity at any instant that is opposite that of the signal appearing at terminal 13.

Terminal 12 is directly connected to the emitters of PNP type transistors 16 and 17 by means of leads 19 and 20, respectively, while terminal 13 is directly connected to the emitters of PNP type transistors 23 and 24 by means of leads 25 and 26, respectively. In addition, terminal 12 may also be connected by means of lead 27 to a conventional 90° phase shifting network 28, while terminal 13 may be connected by means of lead 29 to a second conventional 90° phase shifting network 30.

A conventional square wave forming network 31 is connected to receive the output signal from phase shifter 28, while conventional square wave forming network 32 is connected to receive the output signal from phase shifter 30.

The bases of transistors 17 and 24 are connected together by means of lead 33 and to the output junction or terminal 34 of network 31 by means of lead 35. In like manner, the bases of transistor 16 and 23 are also connected together by means of lead 36 and to the output junction or terminal 37 of network 32 by means of lead 38. As shown in FIGURE 1, both networks 31 and 32 are connected to ground by means of leads 39 and 40, respectively, to thereby provide the necessary D.C. paths for the transistors.

The collectors of transistors 16 and 24 are connected to one side of the primary winding 41 of transformer 42 by means of leads 43 and 44, respectively, while the collectors of transistors 17 and 23 are connected to the other side of winding 41 by means of leads 47 and 48, respectively. As shown in FIGURE 1, primary winding 41 is preferably center tapped to ground.

Secondary winding 50 of transformer 42 is connected with circuit output terminals 52 and 53, which connections may be through a conventional wave smoothing filter 55. It is to be appreciated, of course, that transformer 42 and filter 55 are illustrative of means adapting the circuit for connection to an output load, and that a load, if properly adapted, such as the windings of a blower motor, for example, might be connected directly to the collectors of the four transistors, the return path to ground being provided in the load itself.

It is also to be appreciated, that while PNP type transistors are shown and described herein, this invention is not meant to be limited thereto and that other electron control devices, such as, for example, NPN type transistors might be utilized as would be evident to one skilled in the art.

In operation, when an alternating current input signal is received at transformer 8, the signal coupled from secondary winding 9 to the emitters of transistors 16 and 17, as shown by FIGURE 2(*a*), for example, it will be 180° out of phase with the signal impressed upon the emitters of transistors 23 and 24, as shown by FIGURE 2(*b*).

In addition, a control signal to be coupled to the bases of the transistor is provided by coupling the signals as shown by FIGURES 2(*a*) and (*b*) to phase shifters 28 and 30, respectively, where each is shifted in phase by 90°. The output signals from phase shifters 28 and 30 are then coupled to square wave forming networks 31 and 32, respectively, where square wave control signals are generated, as shown by FIGURES 2(*c*) and 2(*d*) respectively.

While a sine wave signal shifted in phase by 90° and coupled to the bases of the transistors as a control signal in the manner as taught by this invention might produce a frequency doubled output, it has been found preferable to square the control signal since this causes fast switching of the transistors between their conductive and non-conductive states, the result of which is that losses due to heat dissipation are reduced to a minimum.

As shown by FIGURE 2, the phase shift of each control signal is preserved so that each square wave control signal coupled to the base of a transistor is in quadrature phase relationship with the input signal coupled to the emitter of that transistor. In addition, and as shown by FIGURES 2(*c*) and 2(*d*), the negative portions of the square wave signals may be clipped in the wave forming networks since it is only necessary for the square wave control signals to bias the transistors to cutoff during alternate half cycles, which, of course, necessitates only the positive portion of the signal when utilizing PNP type transistors as shown in FIGURE 1.

The square wave control signals act essentially to instantaneously switch the four transistors into and out of conduction by pair since the bases of transistors 16 and 23 are tied together as are the bases of transistors 17 and 24. Since the input signal controls the duration of each alternation of the square wave, transistors 16 and 23 are obviously conductive for a half cycle and then are nonconductive for the next half cycle during which transistors 17 and 24 are conductive. As shown by FIGURE 2, since the control signals have been shifted in phase 90°, the switching occurs at the instant when the signal impressed upon each emitter is at a maximum positive or negative.

While terminal 12 is connected to the emitters of transistors 16 and 17, and may couple the signal at a particular instant as shown in FIGURE 2(*a*) to said emitters, the square wave control signals coupled to the bases of transistors 16 and 17 at that same instant will not only be in quadrature phase relationship with the signal appearing at the emitter but will also be 180° out of phase with respect to each other.

In like manner, the square wave control signals coupled to the bases of transistors 23 and 24 will likewise be in quadrature phase relationship with the signal coupled from terminal 13 as well as being 180° out of phase with one another.

Thus, if the signal as shown in FIGURE 2(*a*) appears at the emitters of transistors 16 and 17, the bases of these transistors will have a square wave control signal impressed thereon as shown by FIGURES 2(*d*) and 2(*c*), respectively. In like manner, the signal as shown in FIGURE 2(*b*), which signal is 180° out of phase with the signal as shown in FIGURE 2(*a*), will appear at the emitters of transistors 23 and 24, while the bases of these transistors, like those of transistors 16 and 17, will have impressed thereon the square wave control signal as shown by FIGURES 2(*d*) and 2(*c*), respectively.

Since the control signals alternately bias each pair of transistors to cutoff, and since the emitter of at least one transistor not biased to cutoff by the control signals is never positive with respect to the base, only one transistor is, in fact, conductive at any one time. This is shown by the following chart with time references as shown in FIGURE 2:

| Reference | Transistor States C—Conductive Nc—Nonconductive | | | | Circuit Output | Slope Direction |
|---|---|---|---|---|---|---|
| | 16 | 17 | 24 | 23 | | |
| $t_0$ | NC | NC | NC | NC | Zero | |
| $t_1$ | C | NC | NC | NC | Positive | Positive. |
| $t_2$ (before switching). | C | NC | NC | NC | Maximum Positive. | Zero. |
| $t_2$ (after switching) | NC | C | NC | NC | Maximum Negative. | Zero. |
| $t_3$ | NC | C | NC | NC | Negative | Positive. |
| $t_4$ | NC | NC | NC | NC | Zero | |
| $t_5$ | NC | NC | C | NC | Positive | Positive. |
| $t_6$ (before switching). | NC | NC | C | NC | Maximum Positive. | Zero. |
| $t_6$ (after switching) | NC | NC | NC | C | Maximum Negative. | Zero. |
| $t_7$ | NC | NC | NC | C | Negative | Positive. |
| $t_8$ | NC | NC | NC | NC | Zero | |

As can be seen from the chart, each transistor conducts to the exclusion of the others in the following sequence—16, 17, 24, and 23. As shown by FIGURE 1, since the collectors of transistors 16 and 24 are connected to one side of the primary winding of transformer 42 while the collectors of transistors 17 and 23 are connected to the other, the polarity of the output signal changes each quarter cycle of the input signal, as shown by FIGURE 2(*e*). As also shown by FIGURE 2(*e*), switching of the bias on the bases of the transistors causes the output signal to be switched instantaneously from positive to negative since, in each case, it acts to cut off a transistor previously conducting and render conductive a transistor having its collector connected to the side of the primary winding of transformer 42 opposite to that of the transistor suddenly cut off. This output signal may, of course, then be smoothed with a filter, if desired, or used directly to drive a motor, for example, as brought out hereinabove.

It should be evident from the foregoing that the improved frequency doubling circuit of this invention provides a highly reliable means for doubling the frequency of an input signal without causing appreciable losses due to heat dissipation.

What is claimed as my invention is:

1. A frequency doubler circuit, comprising: first and second input terminal means adapted to be connected to a source of alternating current, the phase of said signal at said first terminal means differing by 180° from that at said second terminal means; phase shifting and signal forming means connected to said input terminal means for shifting the phase of a received signal by 90° and squaring the same, said means having first and second output terminals such that a square wave phase shifted signal coupled from said first output terminal is 180° out of phase with a square wave phase shifted signal coupled from said second output terminal; a first transistor the input electrode of which is connected to said first input terminal means and the control electrode of which is connected to the first output terminal of said phase shifting network; a second transistor the input electrode of which is connected to said second input terminal means and the control electrode of which is connected to the first output terminal of said phase shifting network; a third transistor the input electrode of which connected to said first input terminal means and the control electrode of which is connected to the second output terminal of said phase shifting network; a fourth transistor the input electrode of which is connected to said second input terminal means and the control electrode of which is connected to the second output terminal of said phase shifting network; first and second circuit output terminal means; and means connecting the output electrodes of said first and fourth transistors with said first circuit output terminal means and the output electrode of said second and third transistors with said second circuit output terminal means whereby the frequency of the produced output signal from said circuit is caused to be twice that of an input signal.

2. A frequency doubler circuit for providing an output frequency twice that of an input signal, said circuit comprising: circuit input means for receiving an alternating current signal, said means having first and second terminals such that a signal coupled from said first terminal is 180° out of phase with a signal coupled from said second terminal; first, second, third and fourth transistors each of which has an emitter, a base and a collector; means connecting the emitters of said first and second transistors to said first terminal; means connecting the emitters of said third and fourth transistors to said second terminal; first and second circuit output terminals; means connecting the collectors of said first and fourth transistors with said first circuit output terminal; means connecting the collectors of said second and third transistors with said second circuit output terminal; a first phase shifting network connected to the first terminal of said circuit input means to shift the phase of a received signal by 90°, a second phase shifting network connected to the second terminal of said circuit input means to shift the phase of a received signal by 90°; first and second square wave forming networks for receiving the output signals from said first and second phase shifting networks, respectively, and squaring said signals, said networks clipping the negative portion of said square wave signals; means connecting the output from said first square wave forming network to the bases of said second and fourth transistors; and means connecting the output from said second square wave forming network to the bases of said first and third transistors.

3. A frequency doubler, comprising: first and second input terminal means adapted to be connected to a source of alternating current, the signal at said first input terminal means being 180° out of phase with the signal at said second input terminal means; a first plurality of electron control devices having input, control and output electrodes, said input electrodes receiving the signal from said first input terminal means; a second plurality of electron control devices having input, control and output electrodes, said input electrodes receiving the signal from said second input terminal means; phase shifting means connected to said input terminal means and to the control electrodes of said electron control devices for causing each of said devices to conduct only during a predetermined portion of each input cycle; output terminal means; and means connecting the output electrodes of said electron control devices with said output terminal means in a manner such that the outputs from said electron control devices appearing at said output terminal means are combined to produce an output signal having a frequency that is twice that of an input signal.

References Cited in the file of this patent

UNITED STATES PATENTS

| | | |
|---|---|---|
| 2,303,575 | Nelson | Dec. 1, 1942 |
| 2,323,672 | Nelson | July 6, 1943 |
| 2,914,684 | Essler | Nov. 24, 1959 |
| 3,044,004 | Sicard | July 10, 1962 |